US010747518B2

(12) United States Patent
Hughes et al.

(10) Patent No.: US 10,747,518 B2
(45) Date of Patent: *Aug. 18, 2020

(54) METHOD AND SYSTEM FOR MODIFYING MACHINE INSTRUCTIONS WITHIN COMPILED SOFTWARE

(71) Applicant: Enhance, Inc., Sacramento, CA (US)

(72) Inventors: Chris Hughes, Sacramento, CA (US); Luke Mitchell, Sacramento, CA (US); Adam Schroeder, Sacramento, CA (US)

(73) Assignee: ENHANCE, INC., Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,311

(22) Filed: May 21, 2019

(65) Prior Publication Data

US 2019/0272161 A1    Sep. 5, 2019

Related U.S. Application Data

(63) Continuation of application No. 15/743,896, filed as application No. PCT/US2016/042139 on Jul. 13, 2016, now Pat. No. 10,310,831.

(60) Provisional application No. 62/194,180, filed on Jul. 17, 2015.

(51) Int. Cl.
*G06F 9/44* (2018.01)
*G06F 8/52* (2018.01)
*G06F 8/53* (2018.01)
*G06F 8/61* (2018.01)

(52) U.S. Cl.
CPC ............... *G06F 8/52* (2013.01); *G06F 8/53* (2013.01); *G06F 8/61* (2013.01)

(58) Field of Classification Search
CPC ...................................................... G06F 8/52
See application file for complete search history.

(56) References Cited

U.S. PATENT DOCUMENTS

| 9,027,004 | B1 | 5/2015 | Johnson et al. |
| 2007/0006209 | A1 | 1/2007 | Nguyen et al. |
| 2008/0092129 | A1 | 4/2008 | Prakash et al. |
| 2009/0210702 | A1 | 8/2009 | Welingkar et al. |

(Continued)

FOREIGN PATENT DOCUMENTS

WO    2013003292    1/2013

OTHER PUBLICATIONS

International Searching Authority, PCT Notification of Transmittal of the International Search Report and the Written Opinion of the International Searching Authority, or the Declaration in related international application PCT/US2016/042139, dated Sep. 22, 2016, 14 pages.

(Continued)

*Primary Examiner* — Hang Pan
(74) *Attorney, Agent, or Firm* — Cislo & Thomas, LLP

(57) ABSTRACT

A system and method for modifying a compiled software application to implement additional software code to enhance the functionality of a software application. The system and method comprises receiving a software application binary 601, metadata 602, and modification options 603, analyzing the received components, modifying the software application binary based on the analysis, and returning the modified software application binary 610.

11 Claims, 10 Drawing Sheets

(56) References Cited

U.S. PATENT DOCUMENTS

| | | |
|---|---|---|
| 2010/0333079 A1* | 12/2010 | Sverdlov .................. G06F 8/52 |
| | | 717/168 |
| 2012/0311533 A1 | 12/2012 | Fanning et al. |
| 2013/0019235 A1* | 1/2013 | Tamm ...................... G06F 8/65 |
| | | 717/170 |
| 2013/0024851 A1* | 1/2013 | Firman .................... G06F 8/60 |
| | | 717/170 |
| 2014/0033193 A1 | 1/2014 | Palaniappan |
| 2014/0282371 A1 | 9/2014 | Hirsch et al. |
| 2015/0040112 A1* | 2/2015 | Valencia .................. G06F 8/65 |
| | | 717/168 |
| 2017/0371635 A1 | 12/2017 | Davidson et al. |
| 2018/0203677 A1 | 7/2018 | Hughes et al. |

OTHER PUBLICATIONS

International Preliminary Examining Authority, PCT Notification of Transmittal of International Preliminary Report on Patentability in related international application PCT/US2016/042139, dated Jun. 20, 2017, 14 pages.

European Patent Office, Extended European Search Report related International Patent Application No. 16828260.6, dated Aug. 18, 2018, 10 pages.

Korean Intellectual Property Office, Notification of Grounds for Refusal issued in related International Patent Application No. 10-2018-7003236 dated Jun. 18, 2018, 49 pages.

\* cited by examiner

METHOD AND SYSTEM FOR MODIFYING MACHINE INSTRUCTIONS WITHIN COMPILED SOFTWARE

CROSS-REFERENCE TO RELATED APPLICATIONS

This patent application is a continuation of U.S. patent application Ser. No. 15/743,896 filed Jan. 11, 2018, which is a national phase application (371) of PCT Application No. PCT/US2016/042139 entitled "A Method and System for Modifying Machine Instructions Within Compiled Software," filed Jul. 13, 2016, which claims the benefit of a U.S. Provisional Patent Application Ser. No. 62/194,180 entitled "A Method and System for Modifying Machine Instructions Within Compiled Software," filed on Jul. 17, 2015, which applications are incorporated in their entireties herein by this reference.

TECHNICAL FIELD

This invention relates to systems and methods for modifying machine instructions within compiled software.

BACKGROUND

Web and mobile application companies often rely on third party services to add functionality to their products. These third party services generally require implementation of software code in the form of a software developer kit (SDK), an application programming interface (API), a software library, or other software code. While these third party services can dramatically enhance a user's enjoyment of a web or mobile application, and generate significant value to the company implementing them (i.e. advertising revenue, improved user functionality, enhanced customer support), the burden of installing the third party code falls upon the web and mobile application companies themselves. It can take multiple hours or even days for company personnel (typically an in-house developer) to correctly perform the manual implementation of a single third party SDK. An in-house developer must First identify the appropriate third party service he wants to use from a myriad of choices (e.g., from dozens of competing mobile ad networks), read the associated support manual that provides the installation instructions for using the unfamiliar third party SDK, and then install the SDK directly into the web or mobile application source code. This process is administratively burdensome and requires tedious quality assurance and testing procedures to ensure the installation process was done correctly and has not unintentionally impaired the web or mobile application. For example, a web or mobile company that wants to generate revenue through online advertising, and does not have the resources or time to build its own ad network system, will have to install a third party ad network SDK into its web or mobile app. That SDK will run ads in the web or mobile application and provide advertising revenue to the company.

Third party service providers regularly update their SDKs. If a company wishes to make use of the latest features and functionality of the third party service, it must implement the upgraded SDK into its web or mobile application. This is not a simple and quick process. The web or mobile application must be worked on by skilled developers, potentially disrupting business operation. The old SDK must be removed and the upgraded SDK installed and tested by somebody with the required skills and experience. A successful company that has multiple third party SDKs may have to employ a team of in-house developers full time to manage this process. For this reason, many web and mobile application developers simply avoid using what would otherwise be desirable third party services. The burden of identifying the best third party services, managing the various first time SDK installations tracking when SDK updates are available and then re-performing the laborious installation and testing process can be overwhelming to a small business. In fact, a new term has been coined for managing the deluge of new and updated SDKs: 'SDK fatigue'.

The costs associated with implementing a third party system can be prohibitively high for a developer, especially when considering the multitude of third party services that he will have to evaluate before choosing one that suits his needs. For example, a developer may need to test a dozen third party ad networks before finding one that works best for his specific application, such as a casual game or a social networking application. The SDK implementation and ongoing management process is so time consuming and difficult for many web and mobile application companies that they simply limit the use of these valuable third party services. The result is that these companies miss out on valuable incremental revenue opportunities and innovative new services that they could be offering to their customers.

Therefore, there is a need for a method of taking a compiled software application and modifying it without the developer needing to evaluate the best third party service most appropriate for his web or mobile application, and doing so without the burden of manually inserting third party software code (SDK, API) into the source code of his web or mobile application. There is also a need for a method that would allow a developer to effortlessly test multitudes of potentially valuable third party services without the challenges and business interruptions normally associated with manually implementing SDKs for each service, enabling web and mobile application companies to rapidly evaluate and implement numerous third party services in order to enhance their product and service functionality in areas such as advertising, analytics, user surveys, crash reporting, developer tools, libraries, app rating prompts, innovative promotional offerings, in app purchases, and modifying the application so that it can properly use hardware on a client device. Furthermore, there is a need for a method to allow existing functions performed by SDKs previously installed in the web or mobile application to be redirected to new or more optimal purposes. Furthermore, there is a need for a method that could perform these modifications in a variety of formats, operating systems, and programming languages, such as iOS, Android, HTML5, C and C+, and Flash.

DISCLOSURE OF INVENTION

The present invention is directed to system and method for modifying a compiled software application to implement additional software code to enhance the functionality of a software application. The system and method comprises receiving a software application binary and modification options, modifying the software application binary based on the modification options, compiling the software application binary, and returning the modified software application binary in a usable format.

It is an object of the present invention to analyze the software application binary, modification options, and metadata to determine if modification of machine instructions is required at a binary level, an assembly level, and/or a source code level, and to automatically perform the modifications at the required level to streamline the modification process.

DETAILED DESCRIPTION OF THE INVENTION

Figure 1:
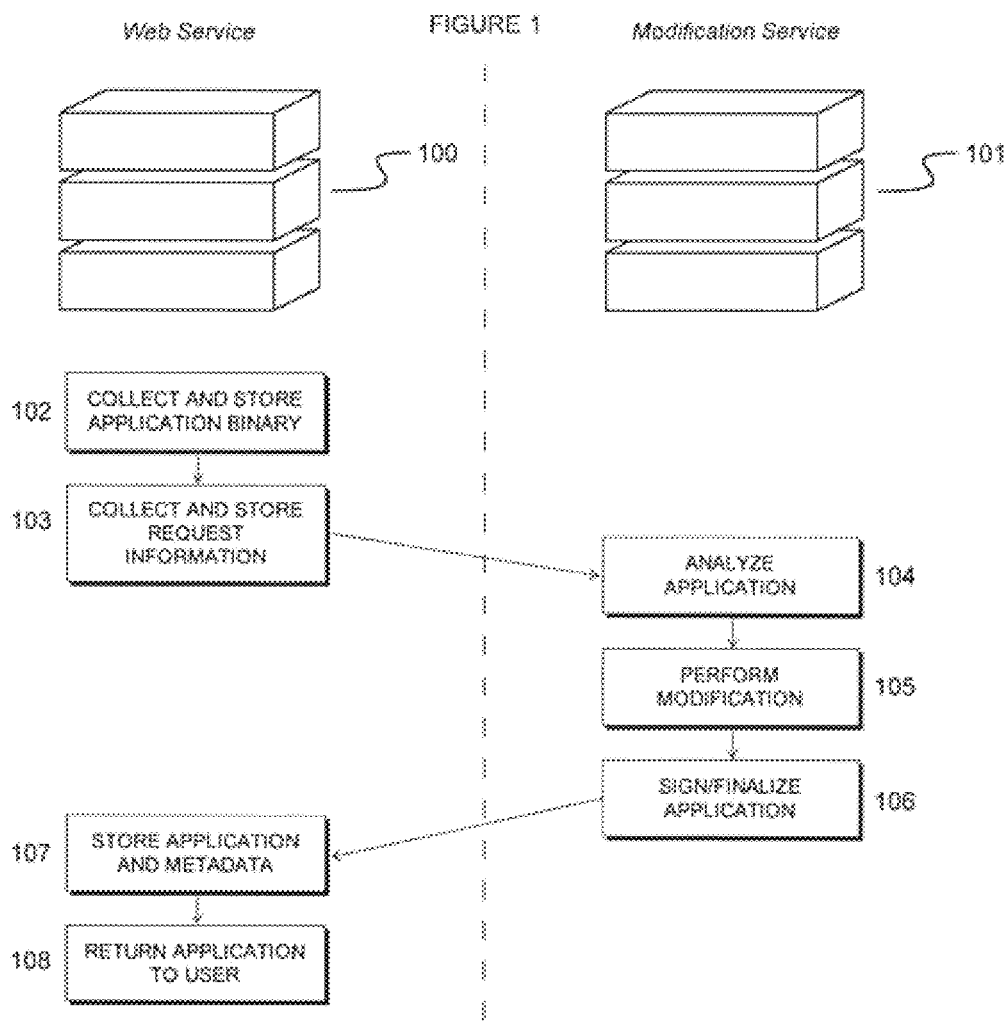
FIG. 1 is a call diagram of a software modification system comprising a web service and modification service in accordance with embodiments of the present disclosure.

The detailed description set forth below in connection with the appended drawings is intended as a description of presently-preferred embodiments of the invention and is not intended to represent the only forms in which die present invention may be constructed or utilized. The description sets forth the functions and the sequence of steps for constructing and operating the invention in connection with live illustrated embodiments. It is to be understood, however, that the same or equivalent functions and sequences may be accomplished by different embodiments that are also intended to be encompassed within the spirit and scope of the invention.

It will be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The term software application binary means a computer application in binary format. The software application binary may be read using the appropriate program, or may be extracted to reveal assets. It should be understood that software application binary, software application, compiled software application, and computer application may be used interchangeably.

The method and system for modifying machine instructions within compiled software comprises software modules for receiving a computer application with desired modification options, analyzing the computer application to determine at what level(s) to modify the computer application, modifying the computer application at the determined level(s), and returning the modified computer application. This method streamlines the modification process by starting at a binary level and only performing modifications in assembly code or source code when necessary, as opposed to a programmer directly embedding modifications within source code.

Figure depicts an embodiment of a method and system for modifying machine instructions within compiled software. While the depicted embodiment comprises a web service 100 and a modification service 101 in order to explain various functions of the present invention, it should be understood that the present invention may be implemented in any number of configurations, such as a single computing device or a plurality of computing devices on public and/or private networks. In the example embodiment, a user interface, such as the web service 100, is used in collecting and storing the software application binary 102, collecting and storing request information 103, such as information relating to modifications and metadata, storing modified applications and metadata 107, and returning the modified application to the user 108. The modification service 101 modifies the application, including analyzing the software application 104, performing modifications on the software application 105, and signing/finalizing the application 106.

In some embodiments, the user interface, such as the web service 100, may be stored on one or more publicly accessible web servers which serve as the gateway for client interaction to the system. The one or more publicly accessible web servers can include virtual computing and/or storage resources, and can provide multiple services. For example, the one or more servers can provide security functionality for users to register/access the system to modify computer applications. In some embodiments, the users may also be required to submit additional security credentials for submitting computer applications to the system or accessing marketplaces such as the Google® Store or Apple® App Store for the system to access and/or replace computer applications. The one or more servers can also provide a user interface and/or extensions for a web browser and/or for applications on a client computer, such as a smartphone, tablet, laptop, or desktop via a network connection.

As shown in step 102, a web service may prompt a user to submit a software application to the system. A user using the web service 100 can direct the web service to collect and store the computer application in one or more ways. In some embodiments, the web service 100 provides a user interface in which the user may upload the software application binary to the web service 100. In some embodiments, in which the software application binary has already been uploaded to an app store, marketplace, or other location, the user may provide the web service 100 with a location where the web service may access and download the software application. In some embodiments, the web service requires the user to provide security credentials that allow the web service to access the software application marketplace.

In step 103, the web service 100 also collects and stores request information from the user. In some embodiments, the web service 100 provides options for the user to choose from to determine what type of modifications and what type of information the user will provide to the web service 100. For example, the request information may include details of modifications that the user is requesting from the service, metadata describing the application, and application signing information.

Metadata can be useful in aiding the modification service 101 in determining what modifications to make, such as by supplying the operating platform and the code structure of the application. Metadata may also be used to be included into the compiled application for configuration or other usage, such as by supplying a version number or the category of application. In some embodiments, metadata is not required and is not collected. For example, in some embodiments, the system automatically chooses modifications on behalf of the user, so metadata is not relevant or needed and is not collected. In some embodiments, the metadata may be provided by a user or automatically extracted from the software application. Metadata can include, but is not limited to, the target operating platform of binary, the title of the application, version number, version code, a visual icon, identifier strings (e.g. package name, bundle identifiers, etc.), orientation settings, computer device compatibility, current code structure, list of existing code classes, code structures, methods, string, constants, imports or other constructs used within the application, category of application, subcategory of application, genre, content (maturity) rating, description of the application, descriptive tags associated with the application, application identifiers, SDK, API or library metadata settings, icons, binary assets, images, textual assets, XML, and other such information. Additionally, the information specifying how to modify the machine instructions within the application may include, but is not limited to, whether or not to include, interface, remove, disable, or modify specific SDKs, libraries, code snippets, text, or APIs.

In some embodiments, the web service 100 further accepts information specifying how the application should be digitally signed. The ability to add a digital signature to the software application may help the user to provide proof of ownership of the application, which may be required for other services or systems to function. In embodiments that enable digital signatures, the user may upload signing "keys" or "certificates" that can then be used to sign the application once modifications have been made. In some embodiments, the web service 100 allows a user to select a previously used key or certificate for signing. In some embodiments, the web service 100 allows the user to opt to use a pre-generated certificate specifically for debugging purposes. In some embodiments, the web service 100 provides unsigned applications. In some embodiments, the web service 100 can allow the user to generate a new certificate or key to sign their application with. The new key is then associated with the user and placed within a secure storage mechanism for later use.

Once the web service 100 collects the software application binary and any relevant information, the web service 100 may transfer the software application binary and any relevant information to the modification service 101 to modify the software application binary. In some embodiments, the modification service 101 is stored on one or more private computing systems that are in communication with the web service 100, Having the modification service 101 stored on an array of private computer systems can provide an additional layer of security that protects software applications and modification tools from being exposed to security risks that are inherent in a public system. In some embodiments, the web service 100 and modification service 101 may be on a single server.

In step 104, the modification service 101 analyzes the application to determine how to make the requested modifications. Different types of modifications, such as advertising services, ratings services, and analytics services, may require modification of the software application binary at different coding levels, such as at a binary level, assembly level, or source code level. For example, if a user requests the addition of advertising services as a pop-up whenever the software application first turns on, then the advertising service may be implemented at a binary level without requiring disassembly of binary code into assembly code or decompiling assembly code into source code. However, if the user requests both an advertising service and an analytics service, the modification service 101 may be required to modify the source code at multiple levels, such as the binary level, assembly level, and the source code level. The modification service 101 determines how each modification will modify each level of the software application binary.

In step 105, the modification service 101 then performs the modification on the software application. During this step, information relevant to the modification process is extracted from the software application. This extraction process may include, but is not limited to, the extraction of compressed binary files, disassembly of compiled binary code (byte code, machine code) into other formats, decompilation of assembly code to source code, and decoding or conversion of binary assets to other formats. While the code is in its various formats, modifications are made to the machine instructions. Here, instructions may refer to binary code, bytecode, disassembled or assembly code, and uncompiled/decompiled or source code. Modifying the instructions may be achieved in a variety of ways, including, modification of instructions, inclusion of supplemental instructions, removal of existing instructions, and the modification, inclusion, or removal of metadata, assets (including images), and binary files.

In step 106, the modified application is finalized, such as being built, compiled, compressed, aligned, assembled, or any other method which results in a usable application being created. If applicable, the modified application is also signed using credentials/certificates available to verify the ownership of the application by the user. In step 107, the modified application and metadata is then returned and stored with the web service 100.

In step 108, the application is returned to the user. In some embodiments, the modified application is made available for downloading to the user. In some embodiments, the method in which the modified application is made available may involve, but is not limited to, presenting the software for download, storing the software on a service, allowing internal access for debugging and service improvements, or sending the software to third parties or internal publishing services.

Figure 2:
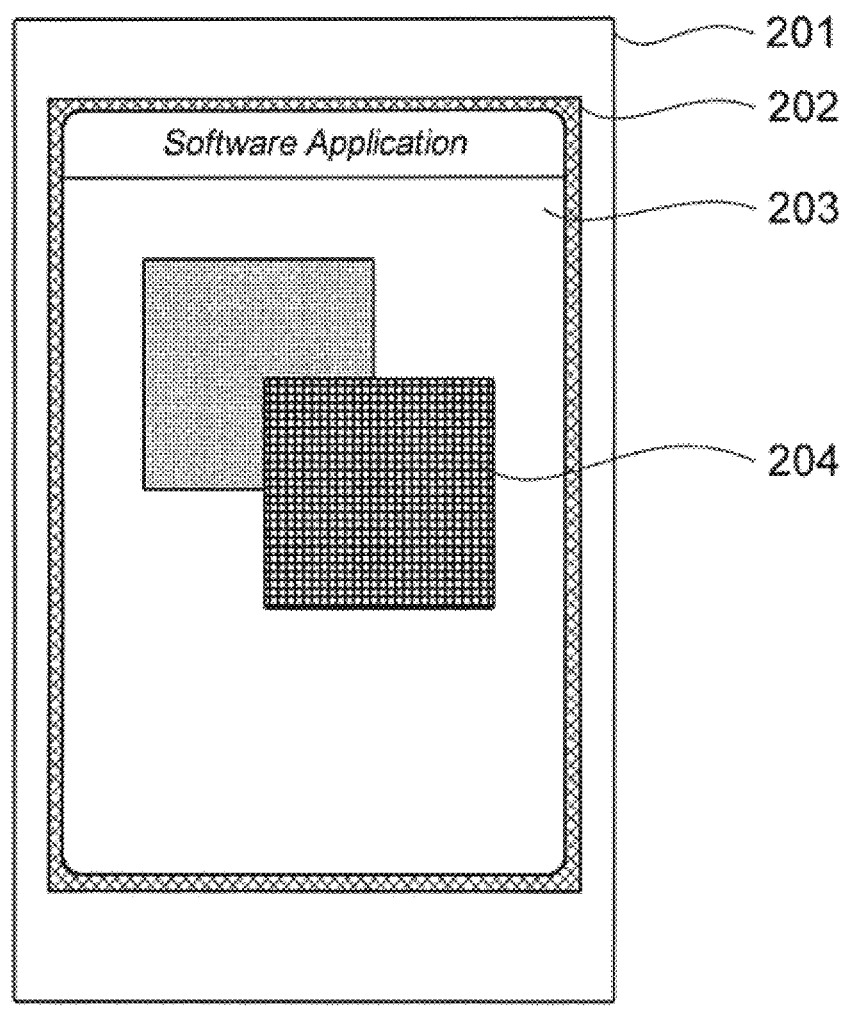
FIG. 2 shows a software application running on a computing device before being modified by an embodiment of the software modification system.

FIG. 2 shows an example software application 203 before modifications have been made. As depicted, the software application 203 is presented on a display 202 of a computing device 201. As shown, the software application 203 has content 204, such as visual and non-visual elements. For example only, these may include images, text, maps, game content, and other multimedia or user interface elements.

Figure 3:
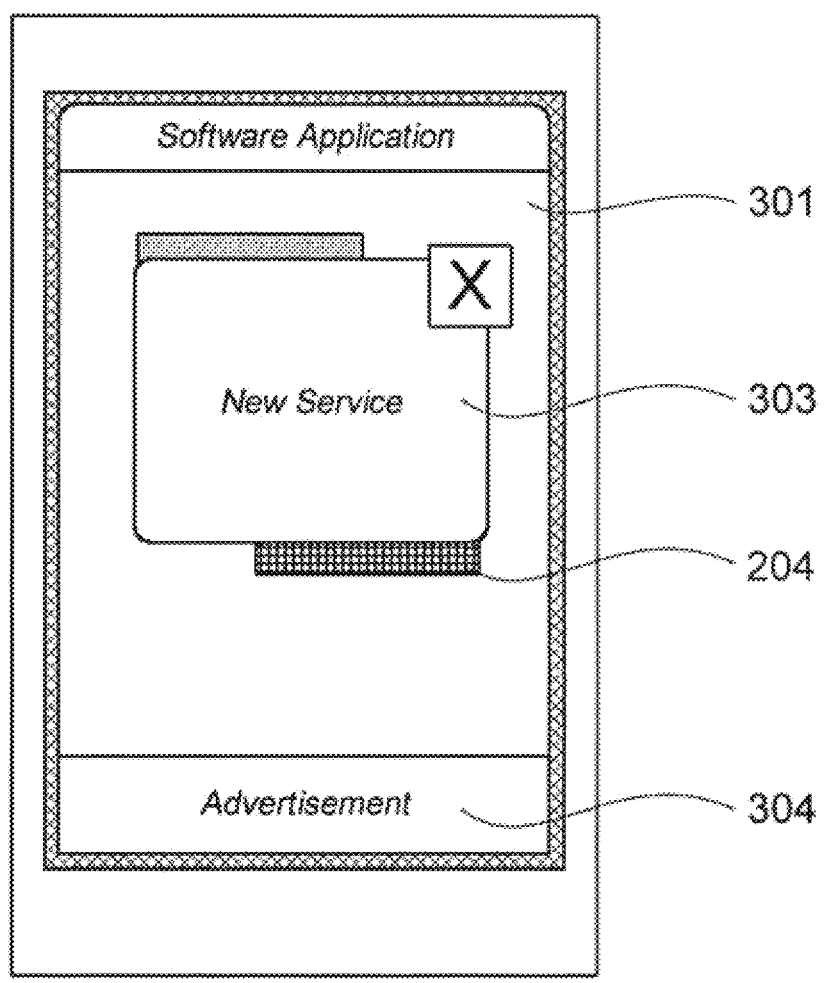
FIG. 3 shows a software application running on a computing device after being modified by an embodiment of the software modification system.

FIG. 3 shows an example modified software application 301 after modifications have been made. As shown, the modified software application 301 may still have its original content 204. It also has modified content that can include visual and non-visual content. In this example, a new service 303 and an advertisement 304 have been added in the modified software application 301. Modifications made to the existing app support these additional features.

Figure 4:
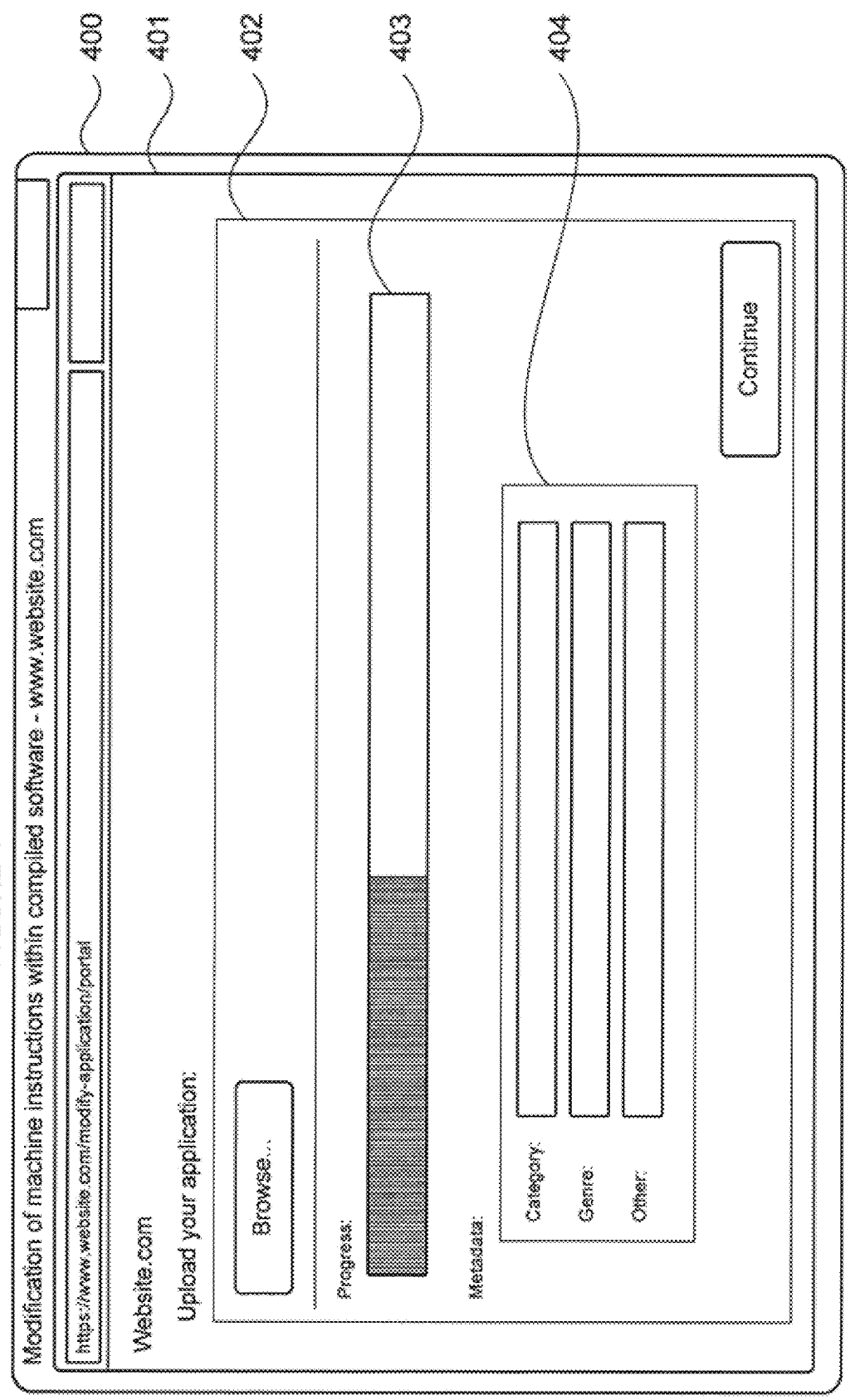
FIG. 4 shows an example computer implementation of a web service in accordance with embodiments of the present disclosure.

FIG. 4 provides an example website 401 viewable from a web browser 400 for interfacing with a user to collect and store a computer application and other relevant data. This example website 401 provides an upload module 402 in order for the user of the browser to upload a software application. The website 401 can show the progress of an upload using a progress bar 403. The website can also provide additional fields 404 in which the user can provide additional information. In the example website 401, the user can provide information relating to the category, genre, and other information such as screen orientation of the application.

Figure 5:
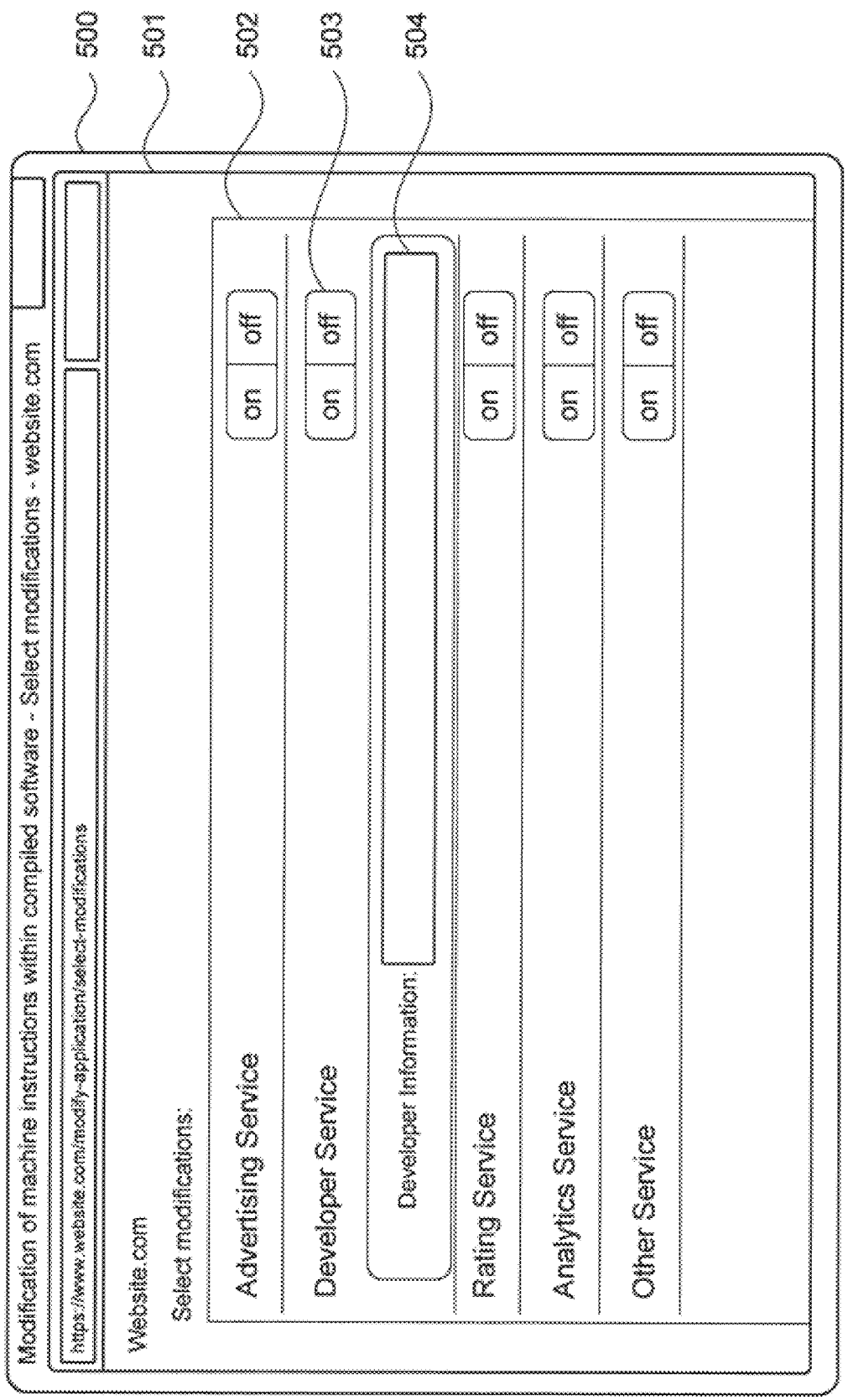
FIG. 5 shows an example computer implementation of modification options provided on a web service in accordance with embodiments of the present disclosure.

FIG. 5 provides an example website 501 for choosing modification options that is accessible from a web browser 500. The modification options menu 502 allows the user to choose what types of services to include in the modified software application. In this example, a user may select toggle boxes 503 to turn services on or off, and may input additional information in input boxes 504 to supply configuration metadata for selected modifications.

Figure 6:
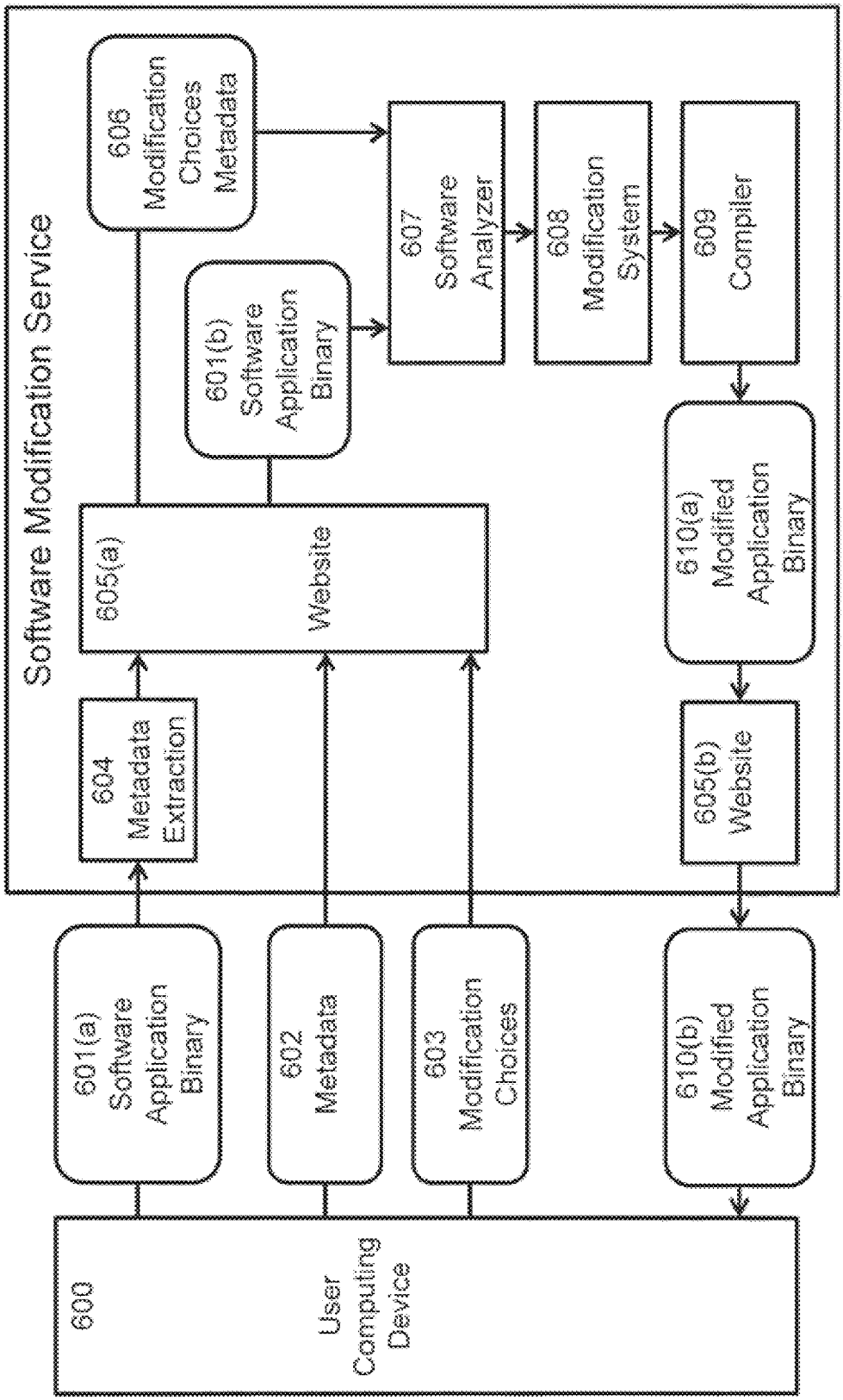
FIG. 6 shows exemplary flow diagrams of a software modification service process in accordance with an embodiment of the present disclosure.

FIG. 6 depicts a software modification flow diagram in accordance with embodiments of the present disclosure. As shown, a user on a computing device 600 provides a software application binary 601(a) to the software modification service, such as to the website 605(a). The user may also provide metadata 602 and modification choices 603 to the website, and/or the software modification service may perform further metadata extraction 604 on the software application binary 601(a). Once all relevant data is gathered, including the software application binary 601(b) and modification choices metadata 606, it is provided to the software analyzer 607 to determine the necessary steps required to modify the application. The modifications are then performed in step 608, and then compiled in step 609 into a usable format as the modified application binary 610(a). The website then allows access to the modified application, which can be provided to the user computing device in step 610(b) or provided to a user in other ways, such as by allowing internal access for debugging and service improvements, or by sending the software to third parties or internal publishing services.

Figure 7:
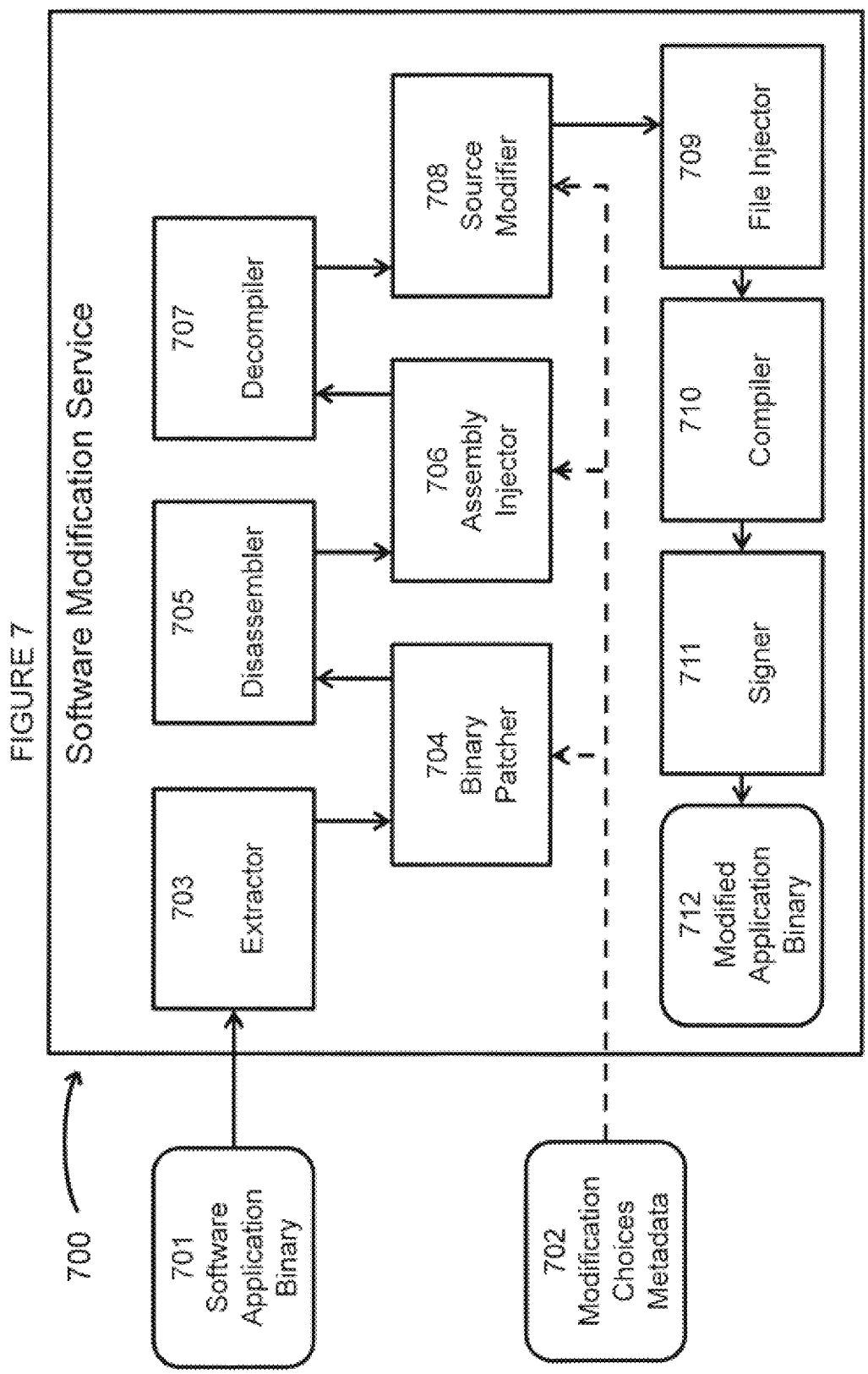
FIG. 7 shows exemplary flow diagrams of a software modification system process in accordance with an embodiment of the present disclosure.
Figure 8:
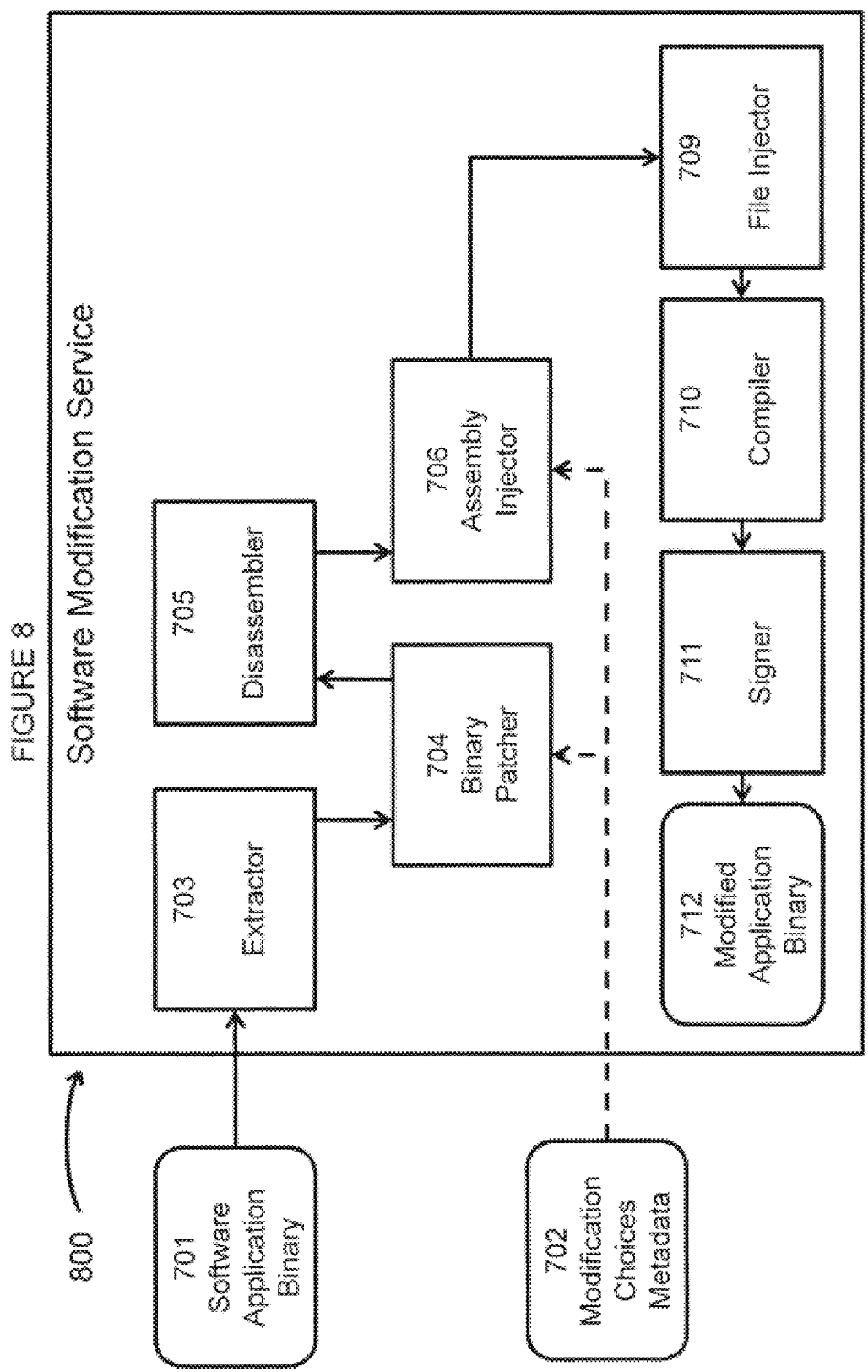
FIG. 8 shows exemplary flow diagrams of a software modification system process in accordance with an embodiment of the present disclosure.
Figure 9:
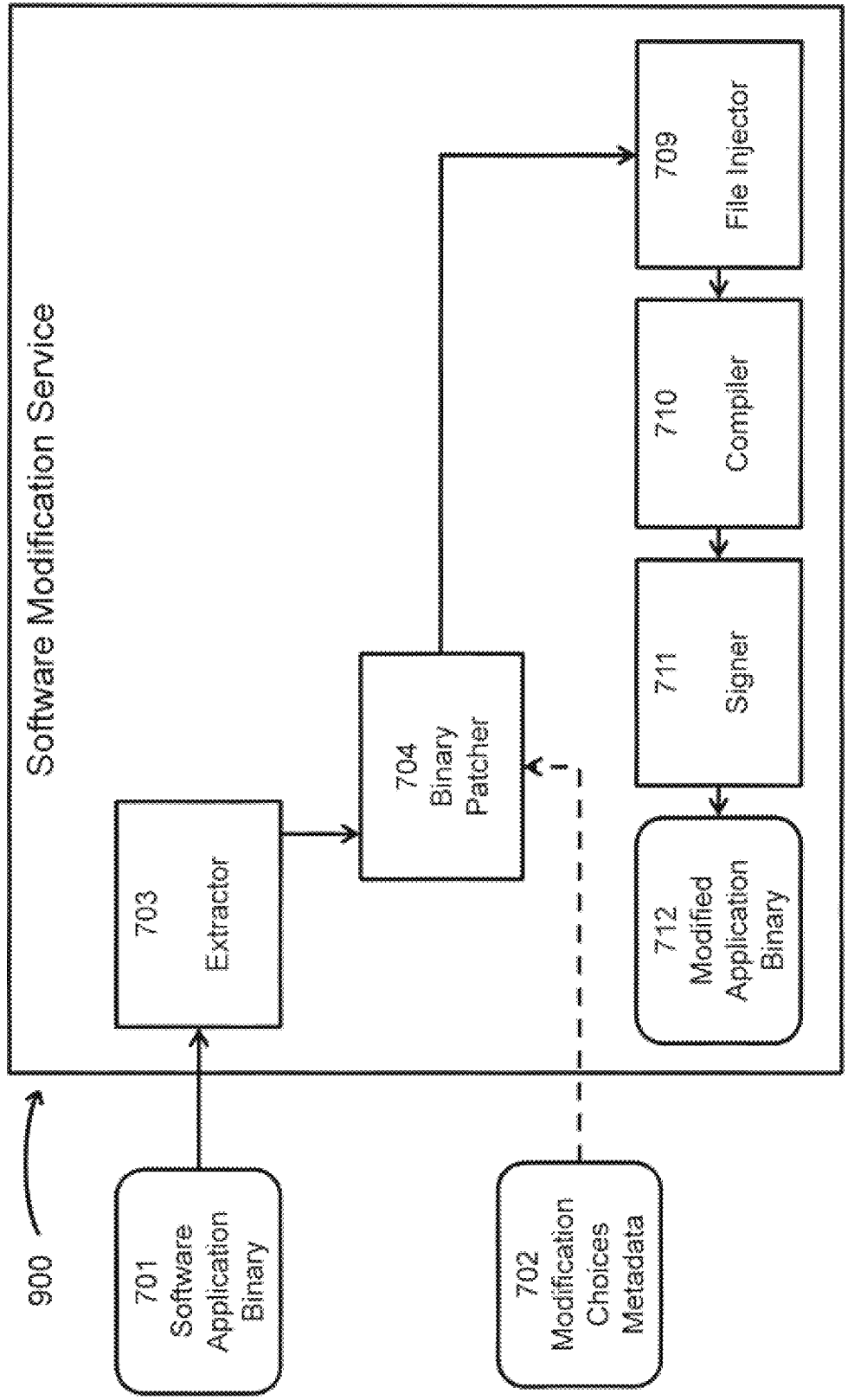
FIG. 9 shows exemplary flow diagrams of a software modification system process in accordance with an embodiment of the present disclosure.

FIGS. 7-9 depict various flow diagrams of the modification system 608 that vary based on what the software analyzer 607 determines is required in order to modify the software application. FIG. 7 depicts a software modification system 700 in which it has been determined that modification to binary instructions, assembly instructions, and source code are required. As shown, the software application binary 701 and any modification choices and metadata 702 are supplied to the software modification system 700. The extractor 703 extracts the application binaries to reveal assets, if applicable, and then the binary patcher 704 modifies the binary instructions based on the modification choices and metadata 702. The disassembler 705 then disassembles the application binary files into assembly instructions, and the assembly injector 706 modifies the assembly instructions based on the modification choices and metadata 702. The decompiler 707 then decompiles the assembly instructions into source code, and source modifier 708 modifies the source code based on the modification choices and metadata 702. A file injector 709 then injects or patches files or metadata into the deconstructed application. The compiler 710 compiles the application in various rounds into a usable format. Then, if applicable, the signer 711 signs the modified application to verify ownership of the application to the user. The modified application binary 712 is then made available to the user.

In some embodiments, if certain types of modifications are not required, they are skipped. FIG. 8 depicts a software modification system in which no modification to the source code is required. Instead, the modifications are performed on a binary level (extractor 703 and binary patcher 704) and assembly level (disassembler 705 and assembly injector 706). FIG. 9 depicts an embodiment of the software modification system in which no modification of the source code or the assembly code is required. Instead, all modifications are done on a binary level (extractor 703 and binary patcher 704).

In various embodiments, the method steps described herein, including the method steps described in FIGS. 1 and 6-9, may be performed in an order different from the particular order described or shown. In other embodiments, other steps may be provided, or steps may be eliminated, from the described methods.

Systems, apparatus, and methods described herein may be implemented using digital circuitry, or using one or more computers using well known computer processors, memory units, storage devices, computer software, and other components. Typically, a computer includes a processor for executing instructions and one or more memories for storing instructions and data. A computer may also include, or be coupled to, one or more storage devices, such as one or more magnetic disks, internal hard disks and removable disks, optical disks, etc.

Systems, apparatus, and methods described herein may be used within a network-based cloud computing system. In such a network-based cloud computing system, a server or another processor that is connected to a network communicates with one or more client computers via a network. For example, a client computer may communicate with the server via a network browser application residing and operating on the client computer. A client computer may store data on the server and access the data via the network. A client computer may transmit requests for data, or requests for online services, to the server via the network. Certain steps of the methods described herein, including one or more of the steps of FIGS. 1 and 6-9, may be performed by a server or by another processor in a network-based cloud-computing system. Certain steps of the methods described herein, including one or more of the steps of FIGS. 1 and 6-9, may be performed by a client computer in a network-based cloud computing system. The steps of the methods described herein, including one or more of the steps of FIGS. 1 and 6-9, may be performed by a server and/or by a client computer in a network-based cloud computing system, in any combination.

Figure 10:
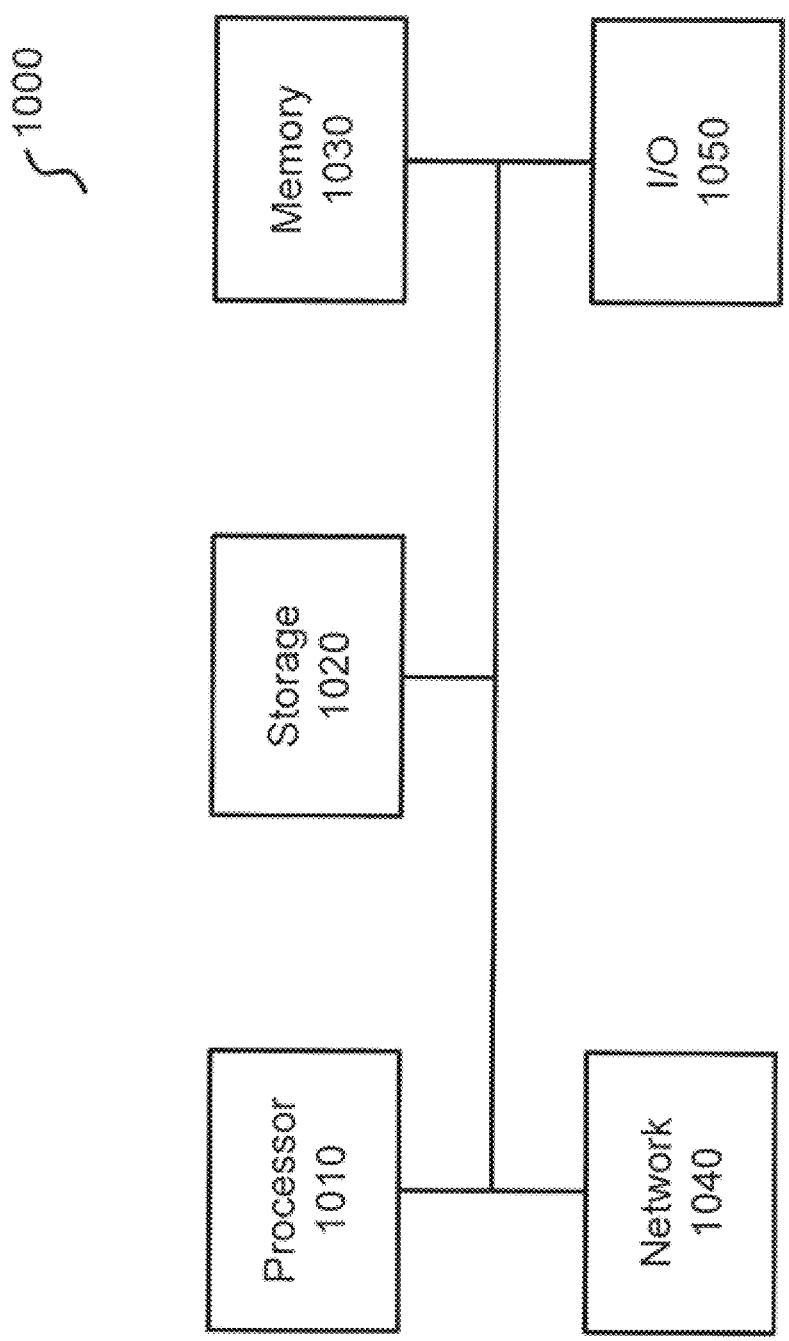
FIG. 10 shows a high-level diagram of a computer that may be used to implement various aspects of the present disclosure in certain embodiments.

A high-level block diagram of an exemplary computer 1000 that may be used to implement systems, apparatus, and methods described herein is illustrated in FIG. 10. The computer 1000 comprises a processor 1010 operatively coupled to a data storage device and memory. Processor 1010 controls the overall operation of computer 1000 by executing computer program instructions that define such operations. The computer program instructions may be stored m data storage device 1020, or other non-transitory computer readable medium, and loaded into memory 1030 when execution of the computer program instructions is desired. Thus, the method steps of FIGS. 1 and 6-9 can be defined by the computer program instructions stored in memory 1030 and/or data storage device 1020 and controlled by processor 1010 executing the computer program instructions.

For example, the computer program instructions can be implemented as computer executable code programmed by one skilled in the art to perform an algorithm defined by the method steps in FIGS. 1 and 6-9. Computer 1000 also includes one or more network interfaces 1040 for communicating with other devices via a network. Computer 1000 may also include one or more input/output devices 1050 that enable user interaction with computer 1000 (e.g., display, keyboard, touchpad, mouse, speakers, buttons, etc.).

Processor 1010 can include, among others, special purpose processors with software instructions incorporated in the processor design and general purpose processors with instructions in storage device 1020 or memory 1030, to control the processor 1010, and may be the sole processor or one of multiple processors of computer 1000. Processor 1010 may be a self-contained computing system, containing multiple cores or processors, a bus, memory controller, cache, etc. A multi-core processor may be symmetric or asymmetric. Processor 1010, data storage device 1020, and/or memory 1030 may include, be supplemented by, or incorporated in, one or more application-specific integrated circuits (ASICs) and/or one or more field programmable gate arrays (FPGAs). It can be appreciated that the disclosure may operate on a computer 1000 with one or more processors 1010 or on a group or cluster of computers networked together to provide greater processing capability.

Data storage device 1020 and memory 1030 each comprise a tangible non-transitory computer readable storage medium. By way of example, and not limitation, such non-transitory computer-readable storage medium can include random access memory (RAM), high-speed random access memory (DRAM), static random access memory (SRAM), double data rate synchronous dynamic random access memory (DDRRAM), read-only memory (ROM), erasable programmable read-only memory (EPROM), electrically erasable programmable read-only memory (EEPROM), flash memory, compact disc read-only memory (CD-ROM), digital versatile disc read-only memory (DVD-ROM) disks, or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Network/communication interface 1040 enables the computer 1000 to communicate with networks, such as the Internet, also referred to as the World Wide Web (WWW), an intranet and/or a wireless network, such as a cellular telephone network, a wireless local area network (LAN) and/or a metropolitan area network (MAN), and other devices using any suitable communications standards, protocols, and technologies. By way of example, and not limitation, such suitable communications standards, protocols, and technologies can include Ethernet, Wi-Fi (e.g., IEEE 802.11), Wi-MAX (e.g., 802.16), Bluetooth, near field communications ("NFC"), radio frequency systems, infrared, GSM, EDGE, HS-DPA, CDMA, TDMA, quadband, VoIP, IMAP, POP, XMPP, SIMPLE, IMPS, SMS, or any other suitable communications protocols. By way of example, and not limitation, the network interface 1040 enables the computer 1000 to transfer data, synchronize information, update software, or any other suitable operation.

Input/output devices 1050 may include peripherals. Input/output devices 1050 may also include parts of a computing device, such as a smartphone having a touchscreen, speakers, and buttons. For example, input/output devices 1050 may include a display device such as a liquid crystal display (LCD) monitor for displaying information to the user, a keyboard and mouse by which the user can provide input to the computer 1000, or a touchscreen for both input and output.

Any or all of the systems and apparatus discussed herein, including personal computers, tablet computers, hand-held devices, cellular telephones, servers, database, cloud-computing environments, and components thereof, may be implemented using a computer such as computer 1000.

One skilled in the art will recognize that an implementation of an actual computer or computer system may have other structures and may contain other components as well, and that FIG. 10 is a high level representation of some of the components of such a computer for illustrative purposes.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:
1. A method of modifying software, comprising:
at a computing device:
(a) receiving a software application binary and existing metadata of the software application binary, the software application binary comprising binary instructions, one or more modification choices of a user, and binary code associated with the one or more modification choices; wherein the one or more modification choices comprise: inserting the binary code associated with the one or more modification choices into the software application binary, removing one or more binary instructions from the software application binary, and disabling one or more binary instructions in the software application binary; wherein the one or more modification choices comprise addition, removal, disabling, and modification of one or more instruction types selected from the group consisting of: software development kits, libraries, code snippets, text, and application programming interfaces;

(b) analyzing the software application binary and existing metadata of the software application binary to determine whether one or more modifications to said binary instructions are required;

(c) analyzing the software application binary and the one or more modification choices to determine whether modifications to assembly instructions are required, wherein if modifications to the assembly instructions are required, then disassembling binary instructions into assembly instructions and modifying the assembly instructions in accordance with said one or more modification choices of the user;

(d) analyzing the software application binary and the one or more modification options to determine whether modifications to source code are required, wherein if modifications to source code are required, then decompiling the assembly instructions into source code instructions and modifying the source code instructions in accordance with said one or more modification choices of the user;

(e) if the modifications to the binary instructions are required, automatically modifying the binary instructions in accordance with the one or more modification choices; wherein modifying the binary instructions comprises inserting the binary code associated with the one or more modification choices into the software application binary, removing one or more binary instructions from the software application binary, or disabling one or more binary instructions in the software application binary;

(f) removing existing metadata and injecting new metadata into the software application binary, whereby a modified software application binary is generated; and (g) returning the modified software application binary.

2. The method of modifying software of claim 1, further comprising signing the modified software application binary using digital keys before returning the modified software application binary.

3. The method of modifying software of claim 2, wherein receiving the software application binary is chosen from the group consisting of receiving the application binary from a user uploading the application binary or downloading the application binary from an online application marketplace.

4. The method of modifying software of claim 3, wherein returning the software application binary is chosen from the group consisting of providing the software application binary for download, providing access to the software application for debugging and service improvements, and publishing the application binary to the online application marketplace.

5. The method of modifying software of claim 1, wherein the new metadata comprises information specifying SDK settings and version number of the software application binary.

6. The method of modifying software of claim 1, wherein the new metadata comprises information specifying a target operating platform or a computer device compatibility of the software application binary.

7. A non-transitory computer-readable storage medium having stored therein instructions, which when executed by a computing device, cause the computing device to:

(a) receive a software application binary and existing metadata of the software application binary, the software application binary comprising binary instructions, one or more modification choices, and binary code associated with the one or more modification choices; wherein the one or more modification choices comprise: inserting the binary code associated with the one or more modification choices into the software application binary, removing one or more binary instructions from the software application binary, and disabling one or more binary instructions in the software application binary; wherein the one or more modification choices comprise addition, removal, disabling, and modification of one or more instruction types selected from the group consisting of: software development kits, libraries, code snippets, text, and application programming interfaces;

(b) analyze the software application binary and existing metadata of the software application binary to determine whether modifications to said binary instructions are required;

(c) analyze the software application binary and the one or more modification choices to determine if modifications to assembly instructions are required, wherein if the modifications to the assembly instructions are required, then disassemble the application binary instructions into assembly instructions and modify the assembly instructions;

(d) analyze the software application binary and the one or more modification choices to determine if modifications to source code are required, wherein if the modifications to the source code are required, then decompile the assembly instructions into source code instructions and modify the source code instructions;

(e) if the modifications to the binary instructions are required, automatically modify the binary instructions in accordance with the one or more modification choices; wherein modification of the binary instructions comprises inserting the binary code associated with the one or more modification choices into the binary instructions, removing one or more binary instructions from the software application binary, or disabling one or more binary instructions in the software application binary;

(f) remove existing metadata and inject new metadata into the software application binary, whereby a modified software application binary is generated; and (g) return the modified software application binary.

8. The non-transitory computer-readable storage medium of claim 7, further comprising instructions to sign the modified software application binary using digital keys.

9. The non-transitory computer-readable storage medium of claim 8, further comprising a user interface, wherein the user interface provides a plurality of modification options for a user to select the one or more modification choices.

10. The non-transitory computer-readable storage medium of claim 7, wherein the new metadata comprises information specifying SDK settings and version number of the software application binary.

11. The non-transitory computer-readable storage medium of claim 7, wherein the new metadata comprises information specifying a target operating platform or a computer device compatibility of the software application binary.

* * * * *